United States Patent
Solan et al.

(10) Patent No.: US 11,704,295 B2
(45) Date of Patent: Jul. 18, 2023

(54) FILESYSTEM EMBEDDED MERKLE TREES

(71) Applicant: EMC IP Holding Company LLC, Hopkinton, MA (US)

(72) Inventors: Alex Solan, Hertzelia (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 6 days.

(21) Appl. No.: 16/830,706

(22) Filed: Mar. 26, 2020

(65) Prior Publication Data
US 2021/0303534 A1    Sep. 30, 2021

(51) Int. Cl.
G06F 16/22    (2019.01)
G06F 16/27    (2019.01)
G06F 16/23    (2019.01)
G06F 16/16    (2019.01)
G06F 16/13    (2019.01)
G06F 16/182    (2019.01)

(52) U.S. Cl.
CPC ........ G06F 16/2246 (2019.01); G06F 16/137 (2019.01); G06F 16/164 (2019.01); G06F 16/182 (2019.01); G06F 16/2282 (2019.01); G06F 16/2358 (2019.01); G06F 16/27 (2019.01)

(58) Field of Classification Search
CPC .... G06F 16/2246; G06F 16/27; G06F 16/182; G06F 16/164; G06F 16/2282; G06F 16/137; G06F 16/2358; G06F 16/273; G06F 16/275; G06F 16/278
See application file for complete search history.

(56) References Cited

U.S. PATENT DOCUMENTS

2019/0347351 A1\* 11/2019 Koomthanam ....... H04L 41/084
2021/0191903 A1\* 6/2021 Shetty .................. G06F 16/211

OTHER PUBLICATIONS

Rolling Hash, Wikipedia, https://en.wikipedia.org/wiki/Rolling_hash.
Muthitacharoen, Chen and Mazieres, titled "A Low-bandwidth Network File System," MIT Laboratory for Computer Science and NYU Department of Computer Science, https://pdos.csail.mit.edu/papers/lbfs:sosp01/lbfs.pdf.
Checksums and Self-Healing Data, Oracle Corporation, https://docs.oracle.com/cd/E19253-01/819-5461/gaypb/index.html.
FAQ from btrfs Wiki, https://btrfs.wiki.kernel.org/index.php/FAQ#What_checksum_function_does_Btrfs_use.3F.

\* cited by examiner

*Primary Examiner* — Alex Gofman
*Assistant Examiner* — Erich Alexander Fischer
(74) *Attorney, Agent, or Firm* — Workman Nydegger

(57) ABSTRACT

One example method includes creating a source FS Merkle tree having a structure that matches a topology of a source FS, and a target FS Merkle tree having a structure that matches a topology of a target FS, receiving a change to the source FS, implementing the change in the source FS, updating the source FS Merkle tree to reflect the change, replicating the change to the target FS so that, with respect to the change, the target FS is synchronized with the source FS, updating the target FS Merkle tree to reflect the change to the target FS, and comparing the source FS Merkle tree to the target FS Merkle tree.

20 Claims, 5 Drawing Sheets

FILESYSTEM EMBEDDED MERKLE TREES

FIELD OF THE INVENTION

Embodiments of the present invention generally relate to data protection. More particularly, at least some embodiments of the invention relate to systems, hardware, software, computer-readable media, and methods for filesystem synchronization and replication using a Merkle tree structure.

BACKGROUND

Typical replication systems perform replication at a block level rather than at the filesystem level. Thus, while various systems and approaches exist to ensure file data integrity, somewhat less emphasis has been placed on filesystem integrity. For example, the intent of typical hashing filesystems is to ensure file integrity and not filesystem integrity. As such, those systems typically address only file data.

Another concern with conventional protection systems is that block level data protection of a filesystem is filesystem format dependent. That is, if the representation of the filesystem on a block device is what is protected, then the filesystem format is fixed. To illustrate, it may not be possible to protect an ext3 filesystem, and then restore that filesystem to New Technology Filesystem (NTFS).

Finally, if filesystem hashes do exist, they are employed to ensure data integrity and are not used for data protection. For example, typical filesystems use a cyclic redundancy check (CRC) to ensure there are no errors. However, even filesystems that use universal hashes do so for internal integrity and to detect tampering. The hashing is not part of a general filesystem data protection scheme.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
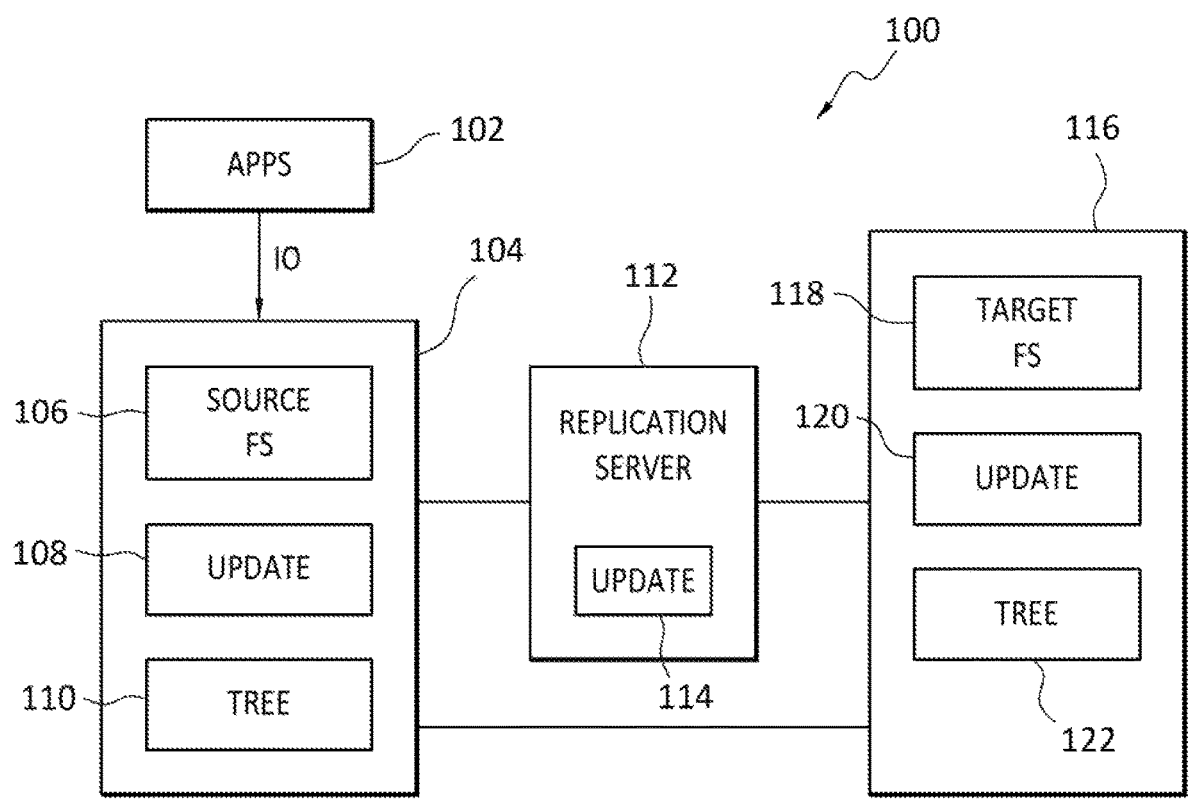
FIG. 1 discloses aspects of an example operating environment.

Embodiments of the present invention generally relate to data protection. More particularly, at least some embodiments of the invention relate to systems, hardware, software, computer-readable media, and methods for filesystem synchronization and replication using a Merkle tree structure.

In general, example embodiments of the invention may employ filesystem replication processes that replicate a source filesystem (FS) to a target FS. To ensure synchronization of the data and FS layout of each of the source FS and the target FS with each other, a Merkle tree of the source FS may be compared with a Merkle tree of the target FS, and any discrepancies corrected. The topology of the source FS Merkle tree and the target FS Merkle tree may be derived from the source FS structure. In this way, replication and synchronization of data may be implemented at the FS level, rather than at a block level.

Embodiments of the invention may thus possess various useful characteristics. For example, the replication mechanism may be FS format agnostic, since replication may not be performed at the block level. As another example, the synchronization of data and FS layout may be efficiently implemented and may not require full sweeps of the entire FS. As a final example, embodiments of the invention may be reliable, and may provide proof that the FS data is indeed consistent.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that replication, and synchronization, at the FS level may be performed regardless of the particular FS format, or OS type. One embodiment of the invention may avoid the need to construct full Merkle trees for the source and target datasets. Embodiments may employ directory level hashes, rather than hashes of individual blocks in the directory. Embodiments of the invention may employ a relatively smaller and simpler Merkle tree that may include hashes of individual files as well as hashes of directories. As a final example, embodiments may enable the handling of large directories, and performance of copy and move operations, while replication of a source FS to a target FS is ongoing.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, any one or more of the disclosed operations. Such operations may include, but are not limited to, data read/write/delete operations, data deduplication operations, data backup operations, data restore operations, data cloning operations, data archiving operations, disaster recovery operations, data consistency checks, and data synchronization operations. More generally, the scope of the invention embraces any operating environment in which the disclosed concepts may be useful, including environments in which part or all of a source dataset is replicated to a target dataset.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, subdirectories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include various applications 102, which may be hosted at one or more clients for example, that issue 10*s*, such as IOs to read, write, modify, and delete, data. The applications 102 may be any type of application including, but not limited to, applications such as word processors, spreadsheets, email applications, and database applications.

The IOs issued by the applications 102 may be directed to a client 104, which may, or may not, also host the applications 102. The client 104 may include a source FS to which the application 102 IOs are directed. The source FS 106 may be located other than at the client 104. The client 104 may further include an update module 108. Among other things, the update module 108 may operate to create and/or update a tree 110 to reflect changes to the source FS 106 resulting from the application 10210*s*. The tree 110 may be updated in real time as the source FS 106 is modified as a result of the IOs issued by the applications 102. In some embodiments, the tree 110 may take the form of a Merkle tree, but any other configuration or structure of comparable functionality may alternatively be employed.

The example operating environment 100 may further include a replication server 112 that may communicate with the client 104. In general, the replication server 112 may serve to replicate the source FS 106 to one or more targets. In some embodiments, the replication of the source FS 106 may be implemented as an ongoing, continuous, process. Additionally, or alternatively, the source FS 106 may be replicated, such as by the replication server 112 for example, at one or more discrete points in time. In some embodiments, the replication server 112 may include an update module 114. In terms of its functionality, the update module 114 may be the same as the update module 108, with the 10 information being communicated by the client 104 to the Update module 114. In some embodiments, one or the other of the update modules 108 and 114 may be omitted.

With continued reference to FIG. 1, a data storage site 116 may also be provided in the example operating environment 100. The data storage site 116 need not have any particular configuration or location but may, in some embodiments, take the form of, or comprise, an on-premises cloud storage site or an off-premises cloud storage site. The data storage site 116 may communicate indirectly with the client 104 by way of the replication server 112 and/or directly with the client 104. In the latter case, the replication server 112 may be omitted, and the replication functionality performed at the data storage site 116, for example.

Note that while FIG. 1 refers to a replication server 112, the scope of this disclosure extends, more generally, to any systems and/or components that are operable to replicate data of any kind from a source to a target. Thus, the scope of the disclosure embraces, but is not limited to, replication systems that may include, for example, servers, clusters, containers, and other entities. Finally, and as noted above, a replication system need not be involved at all, and data may be sent directly from one or more sources to one or more targets.

Among other things, the data storage site 116 may include a target FS 118 to which the source FS 106 is replicated. As disclosed elsewhere herein, the target FS 118 may be updated, continuously in some embodiments, to reflect changes made to the source FS 106 as a result of IOs issued by the applications 102. This updating of the target FS 118 may be performed by any implementation of the update modules 108, 114, and 120. As well, any of the update modules 108, 114, and 120, may perform, and/or cause the performance of, a consistency check, and/or synchronization, as between the source FS 106 and the target FS 118. The consistency checks may be performed on an ongoing basis as IOs are directed to the source FS 106, and/or may be performed at one or more discrete points in time.

The data storage site 116 may also include a tree 122 that is similar, or identical, in structure and function to the tree 110. In general, the tree 122 may be updated, such as by one of the update modules 114 or 120 for example, to reflect changes made to the target FS 118. Each of the trees 110 and 122 may be stored together with the dataset to which it respectively corresponds, namely, the source FS 106 and the target FS 118. However, the trees 110 and 122 need not reside, or be hosted, at any particular location or by any particular entity. In one example embodiment, one or both of the trees 110 and 122 may reside at the replication server 112.

Note that as used herein, a 'filesystem' embraces, but is not limited to, any structure, or combinations of structures, configured to store one or more files, although it is not required that a filesystem include any files. That is, a filesystem may be empty. No particular structure of a filesystem is required. In some embodiments however, a filesystem may include one or more directories, any of which may have one or more subdirectories. The files in a filesystem may be organized in a particular way within the filesystem, although that is not necessarily required. A filesystem may be, for example, created, modified, deleted, moved, or copied. Examples of modifications to a filesystem include, but are not limited to, addition and/or deletion of one or more files, or directories. A modification to a filesystem may result in one or more corresponding modification to metadata associated with the filesystem, where such metadata may include, for example, the configuration, location, and size, of the filesystem, as well as timestamps associated with filesystem content, and timestamps associated with addition, modification, and/or deletion, of filesystem content, or the filesystem itself.

B. Overview—Hashing

Following is a brief background, as well as a discussion of various hashing approaches and techniques that may be employed in connection with some embodiments of the invention. These approaches and techniques are presented only by way of example and are not intended to limit the scope of the invention in any way.

In general, embodiments of the invention are concerned with approaches to efficiently synchronize and replicate an FS. Example approaches may include any or all of the following characteristics: the replication mechanism is FS format agnostic, and does not replicate at the block level; synchronization of data and FS layout may be efficient and may eliminate the need for full sweeps of the entire FS; and, reliability, along with the ability to demonstrate that the FS data is indeed consistent.

There are a number of FSs that provide CRCs/hashes on the data files to guarantee that the file content is complete. As noted elsewhere herein, typical replication systems replicate at the block level and not at filesystem level, as the replication mechanism is not dependent on filesystem format. However, example embodiments may implement replication at the filesystem level, thus enabling optimizations that cannot exist at the block level. As well, awareness of the files and filesystem objects, such as implemented by some embodiments, may enable smarter operations. For example, 'copy' may involve many obscure commands at the block level, but may be implemented relatively easily at an FS level. With these points in mind, embodiments of the invention may involve creation of a hash schema on an entire filesystem, and not just the files in the filesystem. This may be achieved, for example, by using a Merkle Tree that has its topology derived from the actual filesystem directory structure.

As noted earlier, embodiments of the invention may involve various hashing techniques and approaches. Initially, reference is made to some characteristics of example hashing functions, any of which may be employed in connection with embodiments of the invention.

One example hashing function that may be employed in some embodiments is a cryptographic hash function. This is a hash function that is guaranteed to be irreversible, that is, the data that was hashed cannot be derived from the hash of that data. As well, a cryptographic hash function may be guaranteed to be unique at an extremely high probability. That is, such a hash function may be referred to as being 'universal,' or having 'universality.' Examples of cryptographic hash functions include, but are not limited to, MD5, SHA1, and SHA256.

Another example of a hash function that may be employed in some embodiments is a rolling hash. In general, when data arrives continuously, such as in a continuous replication scenario, or is changed at specific locations, it is useful to be able to calculate an updated hash without scanning all of the data again. With cryptographic hashes, every slight change in the data requires reading all the data in order to rehash the contents. On the other hand, rolling hashes use a window of data on which the hash is calculated, and then move the window along to calculate the hash. As new data comes into the window, old data goes out and locality of hashing is gained. The rolling hash has many uses such as, for example, Rabin Signatures and Rabin-Karp search algorithm.

A data equivalence, or invariance, refers to what data should result in the same hash value. For example, will a name in lower case and upper case result in the same hash or not. In technical terms, this may be expressed by the question: what is the hash invariant to? Specific hash functions may be designed to allow specific changes. In the example above doing $H(x)=Hash(lowercase(x))$ will make a hash function case invariant. That is, in an invariance circumstance, regardless of whether the uppercase version of the word or the lower case version of the word is hashed, the resulting hash will be the same in either case. Other examples of equivalences are shifts in item location, order of data items that are hashed, and number of changes in data tolerated. To illustrate with respect to this last example, up to 4 bits of a data item may be changed before a change in the hash of the modified data item will occur. Regarding the example of item location, consider the example of a source directory. As long as all of the files in the target directory are the same as in the source directory, the relative order of the files in the respective directories may not matter.

In contrast with cryptographic hashes, a CRC may be used in many applications to detect random errors in data integrity or transmission. However, CRCs are not guaranteed to be unique. In fact, the opposite is true. That is, all correct file CRC calculations are ensured to result in the value 0. Any non-zero result is an indication of an error. The nature of hashes, specifically, fingerprint hashes, is that they are different for different values of data. A universal hash refers to the notion that it may be extremely difficult to create a collision. That is, it may be highly unlikely that, when hashed, two non-equivalent data values will produce the same hash values. Both hashes and CRCs may be used for data integrity testing. One the one hand, CRC is very fast and cheap in terms of processing required, but this high speed and low cost may come at the expense of a significantly higher collision probability, relative to cryptographic hashing. Moreover, CRC is not universal, that is, two data strings may produce the same value, while cryptographic hashes are universal.

There are various examples in the industry of filesystems that using hashing schemes to guarantee correctness of the data. In these cases, hashes are applied to the file data and the FS makes sure that the hash is updated with the file data. Any data corruption may be easily detected. Also file comparison is made easy. That is, if two files generate the same hash, then it may be concluded that the two files are the same, at least so long as a universal hash is employed when hashing the two files.

Some filesystems may use a fixed fingerprint or hashing function, such as SHA1, on every file. This approach is problematic however in that any change in the file requires a re-read of all the file data in order to calculate the new hash. This may lead to an 'object' paradigm or 'immutable' objects, that is, either all of the file data of the modified file is written, or none of it is. Rolling hashes may be employed in such circumstances. Particularly, the most common operation of appending is supported without any overhead. Depending on the rolling hash function, even changes within the file can be made while avoiding a full read by 'patching' the affected area. This may require certain mathematical properties in the rolling hash used.

In general, Merkle Trees are trees of hashes. That is, for a given block device, a tree of hashes may be created and maintained that corresponds to the data itself. Thus, both the data and the associated hashes, that is, the Merkle tree, may be kept. The leaves of a Merkle tree, which may also be referred to as leaf nodes, are the hashes of each block of the device, that is, each leaf corresponds to a block, or a fixed chunk of blocks, such as a chunk of 8 blocks which may be 4 KB in size, for example. The parents of each two, or in general each k, nodes, is the hash of the hashes. For example, and with reference now to the Merkle tree 200 of FIG. 2, the 'Hash 0' is a hash of 'Hash 0-0' and 'Hash 0-1.' The Hash 0-0 is a hash of block L1, while hash 0-1 is a hash of block L2.

Figure 2:
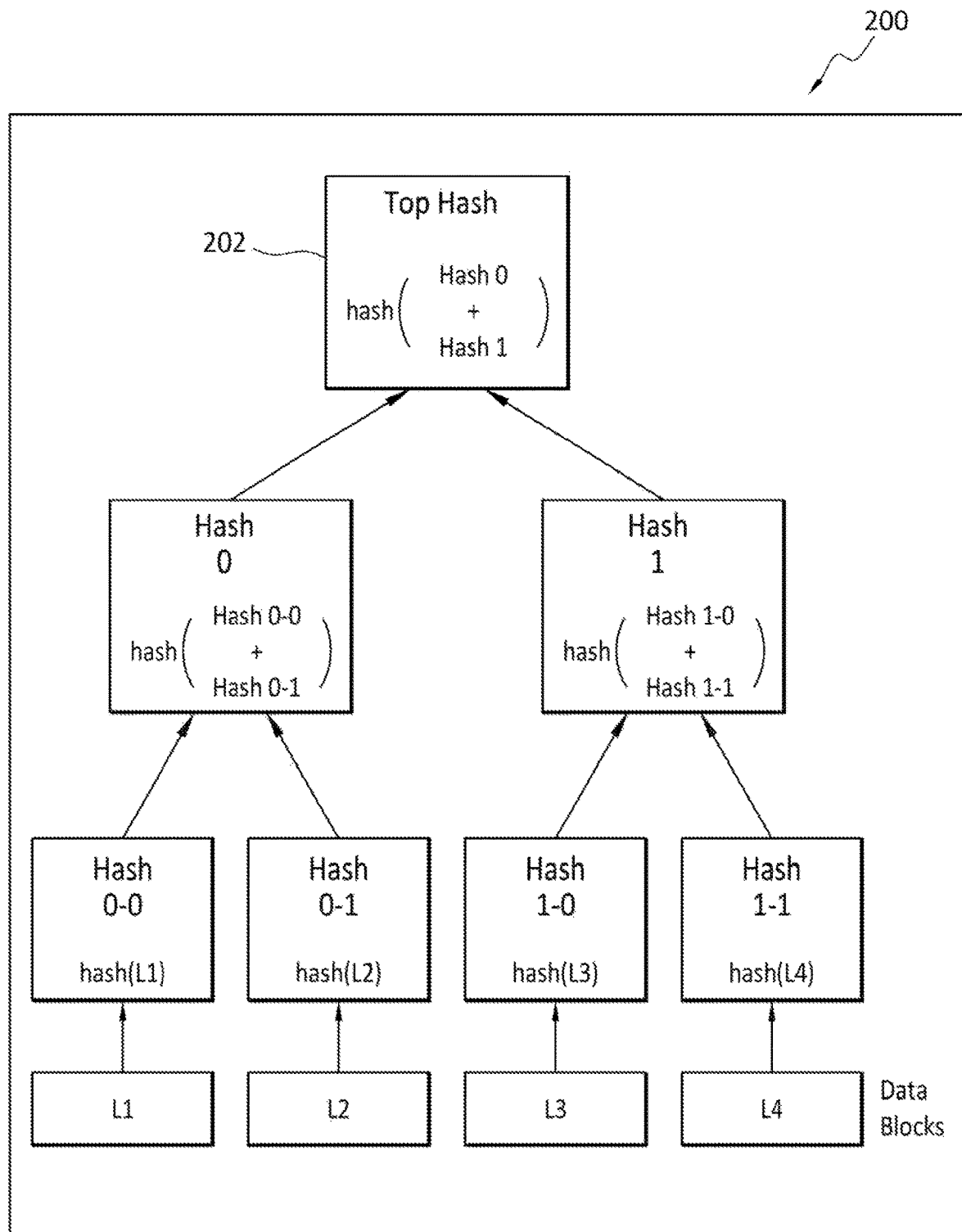
FIG. 2 discloses aspects of an example block level Merkle tree.

As the data changes, such as the block L2 in FIG. 2 for example, hash(L2) and any dependent hashes will have to be recalculated, since the current hash in the Merkle tree does not correspond to the new L2. In more detail, if hash(L2) is recalculated, then all the hashes up the tree to the root has, that is, the 'Top Hash,' also need to be recalculated. This means that for a disk with n blocks, O(log n) hashes need to be updated for every change in data. As an example, a 1 TB disk has 2 billion blocks with a binary tree depth of 31 and, as such, an update operation would require 31 hash operations just to update the tree. Following is a brief discussion of various approaches to data synchronization that may involve the use of Merkle trees.

Attention is directed now to a brief explanation of some non-Merkle tree approaches to data synchronization that help to illustrate the usefulness of Merkle trees in data synchronization processes. By way of background, in replication and backup systems, there is always a process of a full synch of the source dataset and the target dataset. This may be performed, for example, when the system is built and there is a need to replicate the source dataset to a remote site which contains a fresh disk. Subsequent to this initial build out however, there are many situations within the lifecycle of a replication and backup, in which the target is largely similar to the source, with only a small percentage of area changed. For example, a normal daily change of a backup volume is typically a few percent of the overall disk size. In a replication process for example, only a few IOs may be missed due to some bad path flow or loss of synchronization. Following are some brief examples that illustrate some of these concepts.

Assume, for example, that there are two disks in distant locations that are desired to be synchronized so that they have the same data. A simple or naïve approach to data synchronization in this case would be:
  1. Read disk1
  2. Read disk2
  3. Send all disk1 data to location 2
  4. Compare.

This approach would require sending all the data between locations, and would thus be wasteful both in terms of time, and in terms of computing resources.

A better approach might be:
  1. Read disk1 and hash the data blocks
  2. Read disk2 and hash the data blocks
  3. Send disk1 data hashes to location 2
  4. Compare hashes and request the data only for the blocks that have different hashes In this case, we send only the hashes and the blocks that differ, which amounts to a much smaller amount of data to be sent. If the respective data on disks 1 and 2 are completely different, then all the data would have to be sent. However, if only some areas of data on disks 1 and 2 are different, this approach is a substantial improvement over an approach in which all the data is sent.

As illustrated in the following example, various benefits may be obtained through the use of Merkle trees. One such approach involving Merkle trees may be:
  1. Read disk1 and create a Merkle tree 'Tree1' (source dataset)
  2. Read disk2 and create a Merkle tree 'Tree2' (target dataset)
  3. Traverse Tree1 and Tree2 using the function below (pseudo code, run Tree2):

```
Function MerkleSync(node) {
    Hash1 = Get_hash_of_same_node_in_tree1
    If Hash1 == node.hash
        Return; //Hashes match. Subtree matches. Done.
    //if we got to here there is a difference in the subtree
    If node.isLeaf
        Get_data_of_same_node_in_tree1
    else
        //recursively scan the children
        foreach child of node
            MerkleSync(child)
```

To trigger this function on Tree2, call MerkleSync(root2). In this example, Tree1 and Tree2 are identical in structure, since the size of the disks must match. A benefit here is that only a subset of hashes needs to be transferred. That is, if only a specific area of the disk had changes, only hashes and blocks of that area in the subtree are transferred. Thus, the complexity involved with the initial building of the trees is subsequently rewarded by a significant reduction in data transfer that would be required for synchronization.

D. Further Aspects of Some Example Embodiments

With the foregoing discussion in view, details are now provided concerning further aspects of some example embodiments of the invention. Some embodiments of the invention comprise two components, namely, hashing files to protect file data, and FS level hashing to protect the entire FS. The preceding discussion presented various approaches to file hashing. Accordingly, attention is directed next to FS hashing and the associated FS level Merkle trees. In general, the following discussion will address topics including an implicit Merkle tree aligned with an FS topology, a description of properties needed for a directory level hashing function, updating the Merkle tree when changes are made to the files or FS, and use of the FS Merkle tree for data protection and synchronization.

D.1 Implicit Filesystem Merkle Tree

In general, the data to be hashed may be defined at each directory level. The items of information set forth below may be used as inputs for a directory level hash to produce, as an end result, a hash value per directory. Such inputs may include, for example, per file directory metadata. Such directory metadata may include information such as the filename, timestamps of creation, data modifications, and user and security information. Note that embodiments of the invention may use the actual data itself, that is the file data, without reference or regard to the way that the data is stored in the filesystem. This approach may enable filesystem format independence since the focus is on the data rather than on the particular way that the data is stored. Another input for a directory level hash may be a per file content hash, that is, a hash of the file data. Any strongly universal hash, examples of which are disclosed herein, may be employed for creating file content hashes. A further example of input that may be employed in connection with creation of directory level hashes concerns the nature of some directory entries. Specifically, if an entry of a directory is itself a directory, such as a subdirectory for example, then the directory holds the directory level hash of that subdirectory. That is, the schema is recursive.

Figure 3:
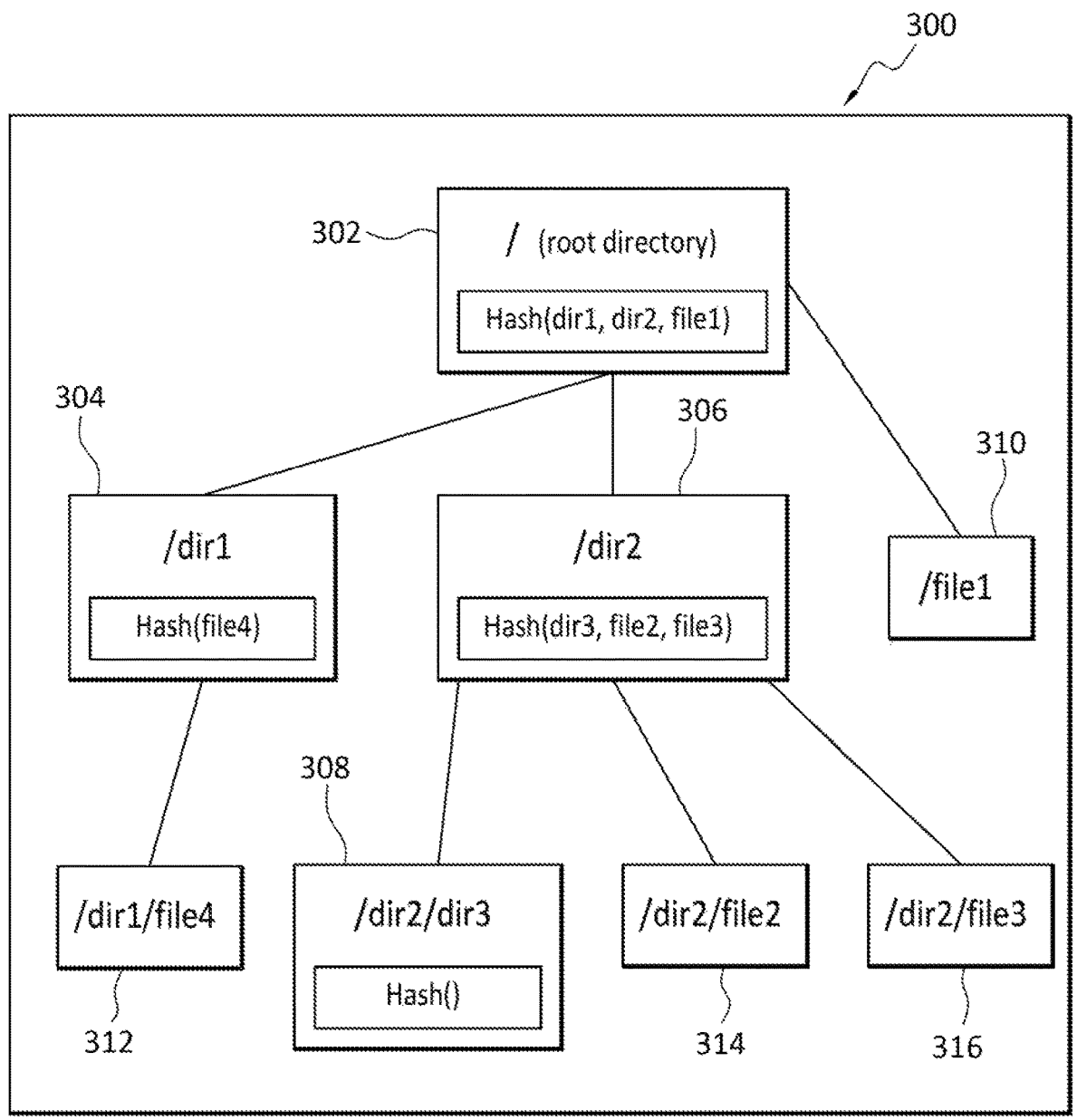
FIG. 3 discloses aspects of an example file/directory level Merkle tree.

With reference now to FIG. 3, this last example input has implications with respect to the Merkle tree structure 300. Generally, a source FS Merkle tree may be embedded in the source FS, and a target FS Merkle tree may be embedded in the target FS.

As shown in the particular example of FIG. 3, the root node 302 of the tree 300 is a directory, or root directory.

Each child of that root node 302 represents either a directory, such as directories 304, 306 and 308, or a file, such as files 310, 312, 314 and 316. Since each file 310, 312, 314 and 316, and directory 304, 306 and 308, has a respective hash representing its contents, the schema is transparent as to what the child node type is, that is, the schema is transparent as to whether the child node is a file or a directory. Thus, the Merkle tree 300 may be recursively created with files as leaves, such as files 310, 312, 314, and 316, and directories as internal nodes, such as directories 304, 306 and 308.

Note that in contrast with the Merkle tree 200, the Merkle tree 300 does not include any hashes that correspond only to a single specific block. Rather, the highest level of granularity in the Merkle tree 300 is, as discussed above, a file. Other differences between the Merkle tree 300 and the Merkle tree 200 will be apparent as well. For example, the tree leaves, such as files 310, 312, 314 and 316, can be anywhere in the Merkle tree 300, not just at the 'bottom' nodes, as in the case of the data blocks 'Ln' in the Merkle tree 200. As another example, the Merkle tree 300 does not have a fixed or common number of children per node. Instead, the number of children per node is a function of how many files/directories are in the directory in question. Further, Merkle tree 300 is not balanced. Particularly, and beginning with the top hash 202 in FIG. 2, it can be seen that the Merkle tree 200 is symmetric in that both sides of the Merkle tree 200 have the same structure with the same number of hashes, that is, three hashes on each side. The top hash 202 has two children, namely, Hash 0 and Hash 1. On the other hand, the Merkle tree 300 is not symmetric with respect to the root node 302, and the root node 302 has three children, namely, directories 304 and 306, and file 310.

D.2 Directory Level Hashing Function

As noted elsewhere herein, embodiments of the invention may provide for hashing data at a directory level and/or a file level. If the number of items in a directory is relatively small, any hash function should be effective. However, as the number of items increases, the cost of hash recalculation, such as may be performed when a file/directory changes, becomes more and more significant. In general, it may be the case that any file manipulation may cause a recalculation in the directory, and up the tree until the root, as a result. Therefore, directory hash recalculation may occur frequently enough that there may be a need to implement some optimization. A variety of different hash alternatives may be employed to this end.

For example, one approach is to use a rolling hash that is additive and commutative, and may be multiplicative as well. This means that when a change in the directory occurs, the old item information can be removed and new item information added without any need to re-calculate the rest of the unchanged items in the directory.

One example of the use of a rolling hash function may proceed as follows: use a standard hash, such as MD5, on each item. Thus, the hash would take the form hash(item), or MD5(item). In this case, MD5 may be a 128 bit hash function. Next, a prime number 'p' may be selected such that 'p' is the largest prime, or one of the largest primes, in the hash range, for example, $2^{127}<p<2^{128}$. Such a prime may be guaranteed to exist. Next, combine the hashes of the items: dirhash=$\Sigma$hash($X_i$) mod p. Thus, when an item changes, all that needs be done is: new$_{dirhash}$=(dirhash−olditemhash+newitemhash) mod p. Then, dirhash may be replaced with the new$_{dirhash}$ in the Merkle tree. Using hashing schemes such as the rolling hash may ensure that directory hash calculations are efficient and, therefore, the whole filesystem hash tree is efficient.

To illustrate with an example, suppose that a file is added to dir3 which, in the state that it is shown in FIG. 3, does not include any files. In this case, Hash(dir3) where dir3 now includes the file would produce, for example, the hash dir3-new. Suppose further that no changes are made to either of filet or file3. Then, a new hash may be calculated for dirt (directory 306) as follows: Hash(dir3-new, filet, file3)=dir2-new. Thus, the hash dir3 is replaced with the hash dir3-new, and the root hash 302 may then be calculated as: Hash(dir1, dir2-new,file1).

Note that if a directory is relatively large, an alternative approach may be to build a 'standard' Merkle tree just for the items of the directory, that is, a Merkle tree that includes a respective hash for each item in the directory. This approach may be beneficial for synchronization processes, as discussed elsewhere herein. The hash of the directory in this case would be the root of the standard Merkle tree. Thus, the leaves of the directory Merkle tree will be the files in the large directory or, alternatively, hashes of the names of those files. Further, use of a directory Merkle tree may ensure that recalculation is done in O(log n) time, where 'n' is the number of files in the directory. Finally, when a Merkle tree is employed for a directory, a specific order may be imposed on the files of the directory that make up the leaves, such as a lexicographical order for example. This may help to ensure that, as between two Merkle trees, the respective orders of the leaf nodes in the trees match each other. In this way, the trees may be invariant as to the order in which the files were added to the directory.

D.3 Updating the Merkle Tree with FS Changes

In general, changes to an FS may reflect themselves in the FS Merkle tree based on the nature of the change. For example, a change to a file will change the file hash and the corresponding directory item metadata. The change to the file hash will, in turn, change the directory hash of the directory where the file is located, and that changed directory hash will then percolate up the directory hierarchy of the Merkle tree to the root, as described earlier in the example referring to dir3 of FIG. 3.

Another example of a change to an FS Merkle tree is a change in a directory, such as by adding a file to the directory and/or removing a file from the directory. Further, a change may occur to file item metadata, where such metadata may include, for example, a timestamp of the file, or a change to the name of the file. As in the case of changes to a file itself, the aforementioned changes may change the hash of the directory where the associated file is located, or was located. Correspondingly, the updated directory hash will percolate up to the root of the Merkle tree.

Other example changes that may be implemented in an FS Merkle tree concern move operations. Specifically, move operations of files or directories are implemented as a remove from the origin directory and an add to the target directory. Thus, a 'cost' of the move operation, in terms of hash recalculations required to update the Merkle tree, may be expressed as the price of a two directory hash updates (removal of the data from the source directory, and addition of the data to the target directory)+ the price of the percolation up to the root hash. Because the depth of a directory tree may typically be not more than 10-12 levels deep, the cost of a move operation may be relatively low.

E. FS Merkle Tree for Data Protection and Synchronization

As noted elsewhere herein, a source FS Merkle tree and target FS Merkle tree may be compared with each other to identify any discrepancies. The discrepancies, if any, may then be resolved, resulting in synchronization of the source FS Merkle tree and the target FS Merkle tree with each other. When the source FS Merkle tree and the target FS Merkle tree are synchronized with each other, they may be referred to as being in a consistent state, that is, the source FS Merkle tree has the same root hash as the target FS Merkle tree. From this, it may be concluded that the source FS is the same as, or matches, the target FS.

In general, a process for checking synchronization, or consistency, between two FS may be operate in the same way as the synchronization process for the standard Merkle tree 200 scheme described herein, including at section C above. Thus, respective source and target FS Merkle tree branches that have the same hash are deemed to match, while differences or inconsistencies refer to any instances where the hashes do not match.

E.1 Handling Large Directories

There may be certain circumstances that may impact the efficiency of updating the FS Merkle trees, namely, the handling of large directories, and the efficiency of file/directory copy and move operations. For example, when traversing the FS trees to attempt to find any differences, the operation proceeds effectively and efficiently when the respective hashes of the source FS tree and target FS tree match. The situation may become somewhat more complicated if, for example, a directory node is encountered where the hashes do not match. This may occur in several nodes along a path that is not consistent. The question may then become one of how to determine which of the children of that directory node is the one that is different. One approach may be to send the directory metadata between the locations, that is, the locations of the source FS tree and the target FS tree, and the compare the hashes of the respective children of the source FS directory node and the target FS directory node. This may be a trivial operation if the number of items in each of the FS trees is small. But if the number of items in the two FS trees is very high, such an approach may quickly become inefficient.

One solution to this may be to use a Merkle tree that is local to that particular directory, whether the directory of concern is in the source FS tree or in the target FS tree, where the discontinuity is located. Such a Merkle tree may be persistent, as described, for example, in D.2 above, and may be used to calculate the directory hash for the directory where the problem was identified. Alternatively, respective Merkle trees may be created ad hoc in both locations, that is, in the location of the source directory and the location of the target directory, for the sole and limited purpose of determining what is going on in a specific directory. Since this may be an issue only for large directories, there may be some criteria or threshold, such as the number of items in the directory where the problem was noted, that may be applied to decide when to send the directory data as-is, and when to use a single persistent Merkle tree that is local to a particular directory of interest, or respective ad hoc Merkle trees at the locations of the source FS and the target FS, to sync more efficiently.

E.2 Copy Operations

In general, copy and move operations may be handled in such a way as to enhance the efficiency with which an FS Merkle tree may be updated. Copy operations may be commonly performed. When scanning a Merkle tree, copy operations may be treated as 'add' operations to the tree. If there is a communication channel between the two locations, that is, between the source FS location and the target FS location, 'add' operations mean that data may need to be transmitted from the source to the target. However, although it may not initially be known, the data may already in the target if the source and target are synchronized, and the copy operation will simply be copying data that already resides at the target.

To handle these circumstances, one approach may take advantage of the fact that the hashes for both file content and directories are universal and, as such, the hash itself may be used as a key to lookup the needed content. Before requesting transmission of the content from the source however, the target FS tree may be examined to see if a hash corresponding to that content exists. If so, the content may be copied locally to the target FS, thereby conserving the bandwidth that would otherwise have to have been used to transmit the data from the source FS location to the target FS location. As another option, where a full filesystem is employed, a 'copy' operation may result in the creation of a reference or pointer, at the target FS, that points to the data that was to be copied. Using this deduplication approach, the data that corresponds to the copy operation need not actually be copied and, thus, a space savings at the target FS location may be realized.

To avoid having to search the entire target FS tree for data that is the subject of a copy operation from the source FS, a 'pickup table' may be employed at the target. In general, a pickup table refers to a temporary data structure, namely, a hash-table with the content hashes as keys, and references to the data as the values that respectively correspond to the keys. Adding and removing keys to the hash-table is very fast, so the overhead to maintain the pickup table may be relatively low. When new content arrives at the target FS from the source FS, a hash of that content may be introduced into the target pickup table. Before requesting content from the source in connection with a copy operation, the pickup table may be consulted to determine if there is content at the target that may be used to service the copy operation. If so, the data may be copied locally to the target FS, or a pointer to the data may be entered in the target FS, so as to conserve transmission bandwidth from the source FS to the target FS.

E.3 Move Operations

Special care may need to be taken with 'move' operations where files or directory structures are moved between different parent directories at the source FS. This is because there may be a lack of awareness of the move operation that happened at the file system level, and possibly changed names while the move happened. When scanning the source FS tree, the move operation may be manifested as a delete from the original location in the source FS tree and an 'add' operation to the new location in the source FS tree. However, the order in which these operations may be detected during the scan of the source FS tree may be unknown. Thus, the 'delete' operation may be detected before the 'add' operation, or vice versa. However, deleting a directory structure at the target FS and then adding the directory structure again, in the new directory structure location at the target FS, means that the data that the directory structure holds would need to be retransmitted from the source FS to the target FS for the add operation. Such an approach may be quite inefficient however, more so since the data was there, that is, at the target FS, just before the delete operation was implemented. A pickup table may help to avoid this problem.

Particularly, if a pickup table is provided at the target, then it may only be necessary to ensure that the hashes corresponding to the content deleted from the source FS are not immediately removed from the pickup table, thus providing an opportunity to look up the content hashes in the pickup table before deletion of the content occurs at the target FS. This may be achieved by delaying deletion of the filesystem content, such as by a few seconds for example, from the target FS. In an alternative approach, this opportunity may be provided by maintaining a reference count to the file content and the pickup table that holds the reference to that content.

Note that retaining the reference to the filesystem means that the filesystem will not actually delete the contents as well. It is noted further that the directory, for example, that moved will incur a change in metadata since it has moved to a new location in the source FS and, accordingly, the hash of that directory will have changed as well and so necessitate an update to the target FS Merkle tree. What is retrieved with the pickup table is not the changed directory but rather the contents of the descendants of that directory, namely, files and directories.

In one alternative approach that may be implemented with respect to 'move' operations, a particular type of pickup table, namely, a 'deletion pickup table,' may be employed at the target, rather than a full pickup table. Particularly, the deletion pickup table may be the exact same hash-table as described for the pickup table, but the deletion pickup table is populated only on 'delete' operations. When 'add' operations are discovered during the scan of the source FS tree, a request for new information from the source FS may be held up until a full source FS tree traversal has been completed. This may ensure that any data that was deleted from the source FS tree will be in the deletion pickup table. Data transmission requests may then be handled by first looking up the content hash in the deletion pickup table. If the content hash already exists, then it may not be necessary to transmit any data from the source to the target. If the content hash does not exist in the deletion pickup table, the corresponding content may be requested by the target FS from the source FS. After this, the hashes corresponding to that content may be deleted from the deletion pickup table.

One advantage of embodiments of the deletion pickup table over the full pickup table is that the deletion pickup table may be much smaller, since it contains only hashes that correspond to deleted items. Thus, the deletion pickup table may require less processing overhead for maintenance. Note that the deletion pickup table may require that transmission requests be queued and aligned with tree traversal completion, to make sure that data has made it to the deletion pickup table before it is requested from the source.

F. Example Methods

Figure 4:
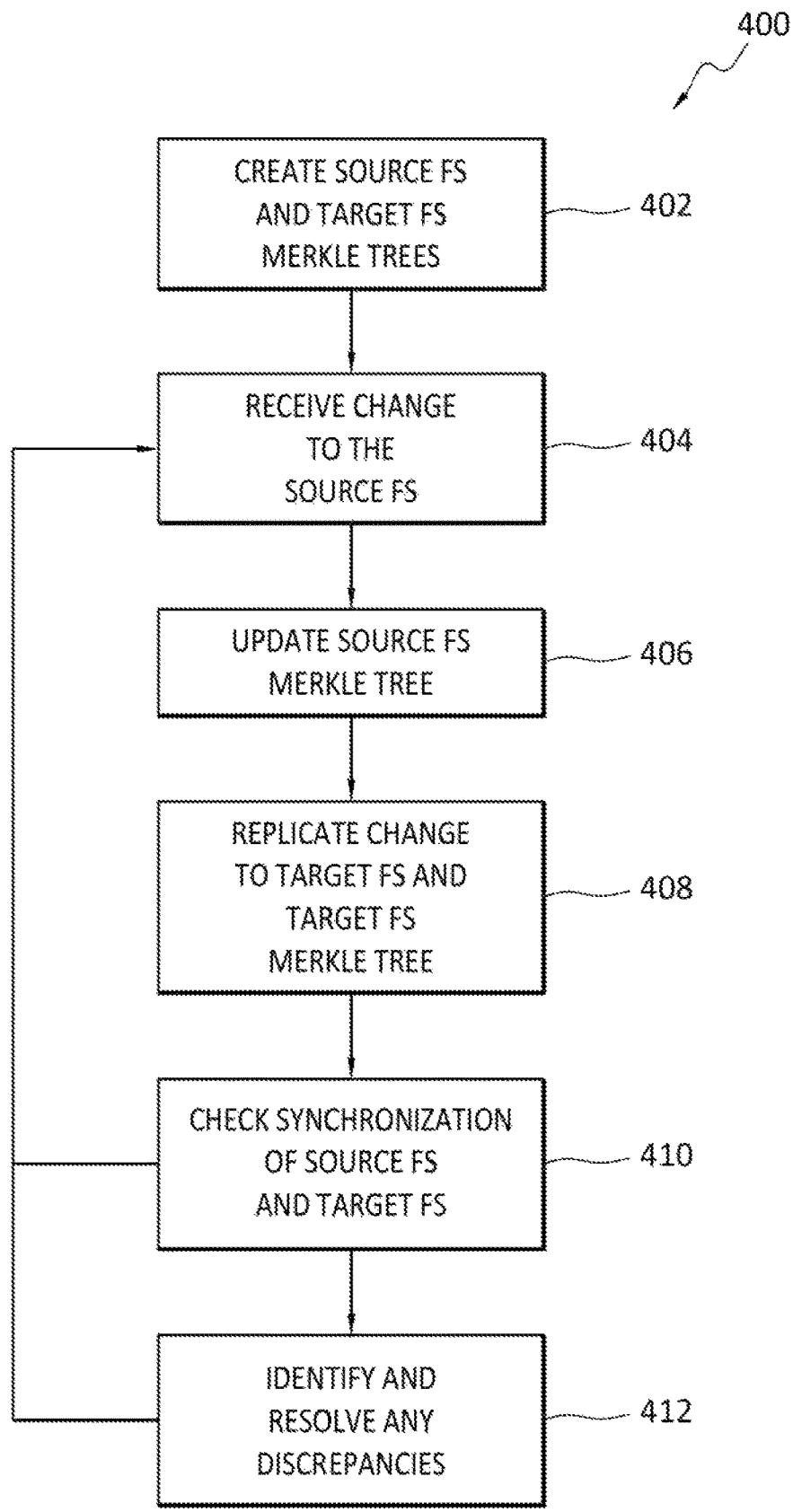
FIG. 4 discloses aspects of an example method.

Directing attention now to FIG. 4, details are provided concerning methods for implementing data replication at a filesystem (FS) level, where one example method is denoted generally at 400. Part or all of the method 400 may be performed by and/or at the direction of a replication server and/or update module, although that is not necessarily required.

The method 400 may begin with construction of a Merkle tree 402 whose structure matches the topology of an FS that is to be protected. A respective Merkle tree may be constructed 402 at each of a source FS location and a target FS location. The Merkle trees may each include one or more leaves that each correspond to a respective file, and/or may include one or more nodes that each correspond to a directory, where the leaf(s) and/or node(s) comprise hash values that correspond to respective elements of an FS, namely, the file(s) and directory(ies). In some embodiments, the Merkle trees do not include any data block level hashes, but only hashes of directories and/or hashes of files.

As part of a replication process, a change to a source FS may be received 404. Examples of such a change include an IO that adds, deletes, or modifies, data of a source FS. Other example changes, which may not be associated with an IO, include copying a file and/or directory of the source FS, and moving a file and/or directory in a source FS to another location in the source FS. In response to the change, the source FS Merkle tree may then be updated 406 accordingly. As disclosed herein, such updates may include, for example, creating hashes of new data and/or recalculating hashes of one or more existing files and/or directories that are affected by the change(s).

In at least some embodiments, these updates, whether to the source FS or the source FS Merkle tree, may not involve any block level operations, and the same is likewise true with respect to the target FS and target FS Merkle tree. As well, any change at the source FS that involves a change in the metadata of a file and/or directory may necessitate a change to the source FS Merkle tree.

After the source FS Merkle tree has been updated in response to one or more changes, a target FS and its corresponding target FS Merkle tree may be correspondingly updated 408 so that the target FS matches the source FS, and the target FS Merkle tree matches the source FS Merkle tree. That is, the process 408 may comprise replicating the changes at the source FS and source FS Merkle tree to the target FS and the target FS Merkle tree, respectively. When replication 408 is complete, the source FS and target FS may be checked 410 for synchronization. Note that 408 may be performed while replication from the source FS to the target FS is ongoing.

In some instances, it may be the case that the source FS and target FS do not match for some reason. However, because the source FS and target FS Merkle trees may be relatively small, possibly having a depth of only 10-12 levels, or fewer, it may be relatively efficient to traverse the target FS Merkle tree to locate the problem. Any discrepancies may be identified and resolve 412, particularly, by traversing the target FS Merkle tree to find the hash(es) that do not match corresponding hash(es) of the source FS Merkle tree, and then taking action to determine the cause(s) of the mismatch. G. Further Example Embodiments Following are some further example embodiments of the invention. These are presented only by way of example and are not intended to limit the scope of the invention in any way.

Embodiment 1. A method, comprising: creating a source FS Merkle tree having a structure that matches a topology of a source FS, and a target FS Merkle tree having a structure that matches a topology of a target FS; receiving a change to the source FS; implementing the change in the source FS; updating the source FS Merkle tree to reflect the change; replicating the change to the target FS so that, with respect to the change, the target FS is synchronized with the source FS; updating the target FS Merkle tree to reflect the change to the target FS; and comparing the source FS Merkle tree to the target FS Merkle tree.

Embodiment 2. The method as recited in embodiment 1, wherein the change comprises one or both of: a modification to a file of the source FS; and, a modification to a directory of the source FS.

Embodiment 3. The method as recited in any of embodiments 1-2, wherein updating the source FS Merkle tree to reflect the change comprises hashing a file of the source FS to create a file hash and/or hashing a directory of the source FS to create a directory hash, and entering the file hash and/or the directory hash into the source FS Merkle tree Embodiment 4. The method as recited in any of embodiments 1-3, wherein the source FS Merkle tree comprises a directory node with which the change is associated, and the method further comprises creating a source FS directory Merkle tree that holds only entries of the directory node, and updating the target FS Merkle tree comprises synchronizing the source FS directory Merkle tree with a corresponding target FS directory Merkle tree.

Embodiment 5. The method as recited in any of embodiments 1-4, wherein implementing the change in the source FS and implementing the change in the target FS comprise directory level operations and/or file level operations.

Embodiment 6. The method as recited in any of embodiments 1-5, wherein updating the source FS Merkle tree and updating the target FS Merkle tree are performed without the use of any block level operations.

Embodiment 7. The method as recited in any of embodiments 1-6, wherein updating the source FS Merkle tree and updating the target FS Merkle tree are performed while replication from the source FS to the target FS is ongoing.

Embodiment 8. The method as recited in any of embodiments 1-7, wherein: the structure of the source FS Merkle tree is configured so that a leaf of the source FS Merkle tree comprises a file hash, and an internal node of the source FS Merkle tree comprises a directory hash; and the structure of the target FS Merkle tree is configured so that a leaf of the target FS Merkle tree comprises a file hash, and an internal node of the target FS Merkle tree comprises a directory hash.

Embodiment 9. The method as recited in any of embodiments 1-8, wherein a move operation involving a file or directory of the source FS is reflected at the target FS Merkle tree using a pickup table at the target.

Embodiment 10. The method as recited in any of embodiments 1-9, wherein the change to the source FS involves a change to metadata respectively associated with a file and/or directory of the source FS.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ('PCM'), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
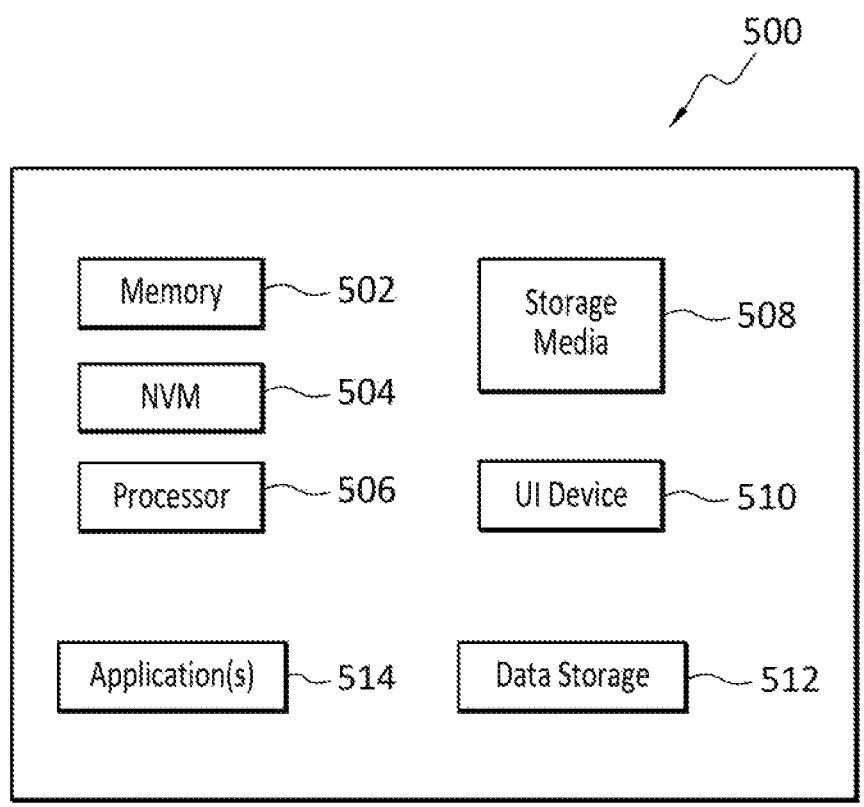
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504, such as random access memory (NVRAM), read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
creating a source FS Merkle tree having a structure that corresponds to a topology of a source FS, and a target FS Merkle tree having a structure that corresponds to a topology of a target FS, wherein:
the structure of the source FS Merkle tree is configured so that a root node of the source FS Merkle tree is a root directory and includes a root hash that is a hash of all contents of the FS Merkle tree, and each child node of the FS Merkle tree below the root node is either a directory or a file; and
the structure of the target FS Merkle tree is configured so that a root node of the target FS Merkle tree is a root directory and includes a root hash that is a hash of all contents of the FS Merkle tree, and each child node of the FS Merkle tree below the root node is either a directory or a file;
implementing a change in the source FS;
updating the source FS Merkle tree to reflect the change;
replicating the change to the target FS so that, with respect to the change, the target FS is synchronized with the source FS;
updating the target FS Merkle tree to reflect the change to the target FS; and
comparing the source FS Merkle tree to the target FS Merkle tree.

2. The method as recited in claim 1, wherein the change comprises one or both of: a modification to a file of the source FS; and, a modification to a directory of the source FS.

3. The method as recited in claim 1, wherein updating the source FS Merkle tree to reflect the change comprises hashing a file of the source FS to create a file hash and/or hashing a directory of the source FS to create a directory hash, and entering the file hash and/or the directory hash into the source FS Merkle tree.

4. The method as recited in claim 1, wherein the source FS Merkle tree comprises a directory node with which the change is associated, and the method further comprises creating a source FS directory Merkle tree that holds only entries of the directory node, and updating the target FS Merkle tree comprises synchronizing the source FS directory Merkle tree with a corresponding target FS directory Merkle tree.

5. The method as recited in claim 1, wherein implementing the change in the source FS and implementing the change in the target FS comprise directory level operations and/or file level operations.

6. The method as recited in claim 1, wherein updating the source FS Merkle tree and updating the target FS Merkle tree are performed without the use of any block level operations.

7. The method as recited in claim 1, wherein updating the source FS Merkle tree and updating the target FS Merkle tree are performed while replication from the source FS to the target FS is ongoing.

8. The method as recited in claim 1, wherein when the comparing indicates that the source FS Merkle tree and the target FS Merkle tree are the same, then the source FS and the target FS are the same as each other.

9. The method as recited in claim 1, wherein an operation involving a file or directory of the source FS is reflected at the target FS Merkle tree using a pickup table at the target.

10. The method as recited in claim 1, wherein the change to the source FS involves a change to metadata respectively associated with a file and/or directory of the source FS.

11. A non-transitory storage medium having stored therein instructions that are executable by one or more hardware processors to perform operations comprising:
   creating a source FS Merkle tree having a structure that corresponds to a topology of a source FS, and a target FS Merkle tree having a structure that corresponds to a topology of a target FS, wherein:
   the structure of the source FS Merkle tree is configured so that a root node of the source FS Merkle tree is a root directory and includes a root hash that is a hash of all contents of the FS Merkle tree, and each child node of the FS Merkle tree below the root node is either a directory or a file; and
   the structure of the target FS Merkle tree is configured so that a root node of the target FS Merkle tree is a root directory and includes a root hash that is a hash of all contents of the FS Merkle tree, and each child node of the FS Merkle tree below the root node is either a directory or a file;
   implementing a change in the source FS;
   updating the source FS Merkle tree to reflect the change;
   replicating the change to the target FS so that, with respect to the change, the target FS is synchronized with the source FS;
   updating the target FS Merkle tree to reflect the change to the target FS; and
   comparing the source FS Merkle tree to the target FS Merkle tree.

12. The non-transitory storage medium as recited in claim 11, wherein the change comprises one or both of: a modification to a file of the source FS; and, a modification to a directory of the source FS.

13. The non-transitory storage medium as recited in claim 11, wherein updating the source FS Merkle tree to reflect the change comprises hashing a file of the source FS to create a file hash and/or hashing a directory of the source FS to create a directory hash, and entering the file hash and/or the directory hash into the source FS Merkle tree.

14. The non-transitory storage medium as recited in claim 11, wherein the source FS Merkle tree comprises a directory node with which the change is associated, and the method further comprises creating a source FS directory Merkle tree that holds only entries of the directory node, and updating the target FS Merkle tree comprises synchronizing the source FS directory Merkle tree with a corresponding target FS directory Merkle tree.

15. The non-transitory storage medium as recited in claim 11, wherein implementing the change in the source FS and implementing the change in the target FS comprise directory level operations and/or file level operations.

16. The non-transitory storage medium as recited in claim 11, wherein updating the source FS Merkle tree and updating the target FS Merkle tree are performed without the use of any block level operations.

17. The non-transitory storage medium as recited in claim 11, wherein updating the source FS Merkle tree and updating the target FS Merkle tree are performed while replication from the source FS to the target FS is ongoing.

18. The non-transitory storage medium as recited in claim 11, wherein when the comparing indicates that the source FS Merkle tree and the target FS Merkle tree are the same, then the source FS and the target FS are the same as each other.

19. The non-transitory storage medium as recited in claim 11, wherein an operation involving a file or directory of the source FS is reflected at the target FS Merkle tree using a pickup table at the target.

20. The non-transitory storage medium as recited in claim 11, wherein the change to the source FS involves a change to metadata respectively associated with a file and/or directory of the source FS.

* * * * *